US012276210B2

(12) United States Patent
Lynn et al.

(10) Patent No.: US 12,276,210 B2
(45) Date of Patent: Apr. 15, 2025

(54) HYDROGEN EXPANSION SYSTEM FOR FUEL CELL USE

(71) Applicant: Joby Aero, Inc., Santa Cruz, CA (US)

(72) Inventors: Robert Gulliver Lynn, Auckland (NZ); Jeffrey Allen Lotterman, Los Angeles, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 18/398,795

(22) Filed: Dec. 28, 2023

(65) Prior Publication Data

US 2024/0218814 A1 Jul. 4, 2024

Related U.S. Application Data

(60) Provisional application No. 63/477,491, filed on Dec. 28, 2022.

(51) Int. Cl.
| | | |
|---|---|---|
| *F01K 25/08* | (2006.01) | |
| *H01M 8/04014* | (2016.01) | |
| *H01M 8/04082* | (2016.01) | |

(52) U.S. Cl.
CPC ......... *F01K 25/08* (2013.01); *H01M 8/04014* (2013.01); *H01M 8/04201* (2013.01); *H01M 2250/20* (2013.01)

(58) Field of Classification Search
CPC .............. F01K 25/08; H01M 8/04014; H01M 8/04201; H01M 2250/20
See application file for complete search history.

(56) References Cited

U.S. PATENT DOCUMENTS

| | | | |
|---|---|---|---|
| 7,275,711 B1* | 10/2007 | Flanigan | ................. B64C 27/24 |
| | | | 244/17.11 |
| 11,565,607 B2 | 1/2023 | Mikic et al. | |
| 11,752,899 B2 | 9/2023 | Mikic et al. | |
| 2003/0230671 A1 | 12/2003 | Dunn | |
| 2006/0280993 A1 | 12/2006 | Keefer et al. | |
| 2008/0223315 A1* | 9/2008 | Doland | ................... F22G 3/006 |
| | | | 122/1 C |
| 2021/0180474 A1 | 6/2021 | La | |
| 2022/0009379 A1 | 1/2022 | Mikic et al. | |
| 2022/0021010 A1* | 1/2022 | Bang | ................. H01M 8/04014 |

(Continued)

FOREIGN PATENT DOCUMENTS

| | | |
|---|---|---|
| WO | 2024102701 | 5/2024 |
| WO | 2024145456 | 7/2024 |

OTHER PUBLICATIONS

"International Application Serial No. PCT US2023 086203, International Search Report mailed Jul. 19, 2024", 3 pgs.

(Continued)

*Primary Examiner* — Hoang M Nguyen
(74) *Attorney, Agent, or Firm* — SCHWEGMAN LUNDBERG & WOESSNER, P.A.

(57) ABSTRACT

A fuel cell system includes a hydrogen expansion system comprising an aeolipile, and a heat exchanger for receiving and expanding hydrogen received from a supply of hydrogen, for provision to the aeolipile. A generator coupled to the aeolipile may generate electrical power from operation of the aeolipile. The hydrogen leaving the aeolipile may be returned to the heat exchanger to transfer heat to the hydrogen received from the supply of hydrogen.

20 Claims, 8 Drawing Sheets

(56) References Cited

U.S. PATENT DOCUMENTS

2022/0381160 A1* 12/2022 Miftakhov ........ H01M 8/04201
2023/0335763 A1* 10/2023 Earl .................. H01M 8/04089

OTHER PUBLICATIONS

"International Application Serial No. PCT US2023 086203, Written Opinion mailed Jul. 19, 2024", 6 pgs.

Feng, Jianmei, "Designing Hydrogen Recirculation Ejectors for Proton Exchange Membrane Fuel Cell Systems", Energies Journal, (Jan. 21, 2023), 11 pgs.

Han, Jiquan, "A review of key components of hydrogen recirculation subsystem for fuel cell vehicles", Energy Conversion and Management: X 15, (2022), 16 pgs.

* cited by examiner

HYDROGEN EXPANSION SYSTEM FOR FUEL CELL USE

RELATED APPLICATION DATA

This application claims the benefit of U.S. Provisional Patent Application No. 63/477,491 filed on Dec. 28, 2022, the contents of which are incorporated herein by reference as if explicitly set forth.

TECHNICAL FIELD

This invention relates generally to the field of fuel cells fueled by liquid hydrogen, including for example for use in electrically-powered or hybrid-powered aircraft.

BACKGROUND

Fuel cell vehicles are powered by compressed hydrogen gas that is fed into an onboard fuel cell "stack," which transforms the hydrogen's chemical energy into electrical energy. This electricity is then available to power the vehicle and its onboard systems.

Hydrogen supplied to a fuel cell enters the anode, where it comes in contact with a catalyst that promotes the separation of hydrogen atoms into an electron and proton. The electrons are gathered by the conductive current collector, which is connected to the vehicle's high-voltage circuitry, feeding an onboard battery and/or electric motors that propel the vehicle. The byproduct of the reaction occurring in the fuel cell stack is water vapor, which is emitted through an exhaust.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The following description of examples of the invention is not intended to limit the invention to these examples, but rather to enable any person skilled in the art to make and use this invention.

Figure 1:
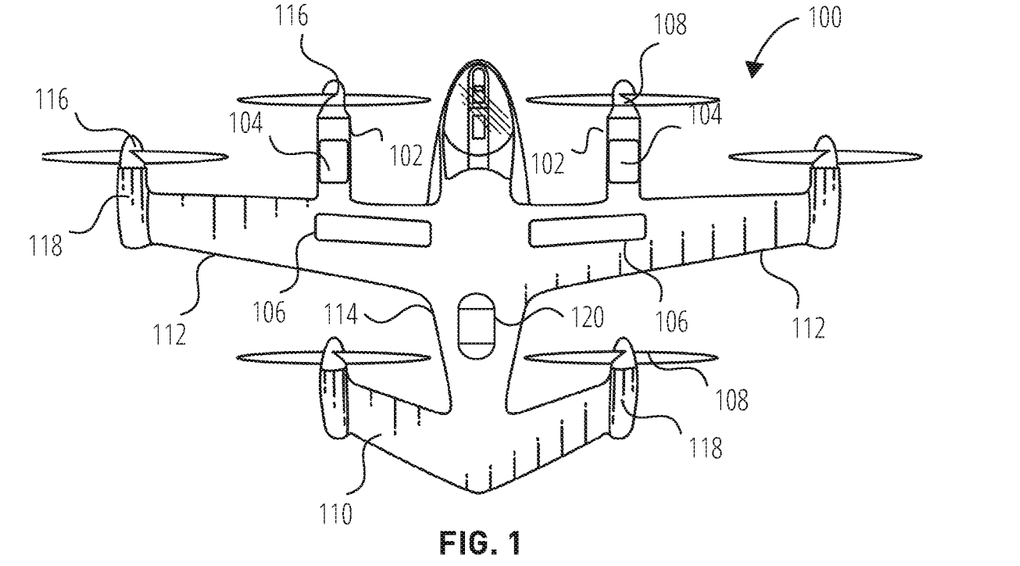
FIG. 1 is a plan view of an aircraft according to some examples.

FIG. 1 is a plan view of an aircraft 100 according to some examples. The aircraft 100 includes a fuselage 114, two wings 112, an empennage 110 and propulsion systems 108 embodied as tiltable rotor assemblies 116 located in nacelles 102, 118. The aircraft 100 includes one or more a nonlinear power sources embodied in FIG. 1 as nacelle fuel cell stacks 104 and wing fuel cell stacks 106. The aircraft 100 will typically include associated equipment such as an electronic infrastructure, control surfaces, a cooling system, landing gear and so forth.

The wings 112 function to generate lift to support the aircraft 100 during forward flight. The wings 112 can additionally or alternately function to structurally support the fuel cell stacks 104, 106 and/or propulsion systems 108 under the influence of various structural stresses (e.g., aerodynamic forces, gravitational forces, propulsive forces, external point loads, distributed loads, and/or body forces, and so forth).

Figure 2:
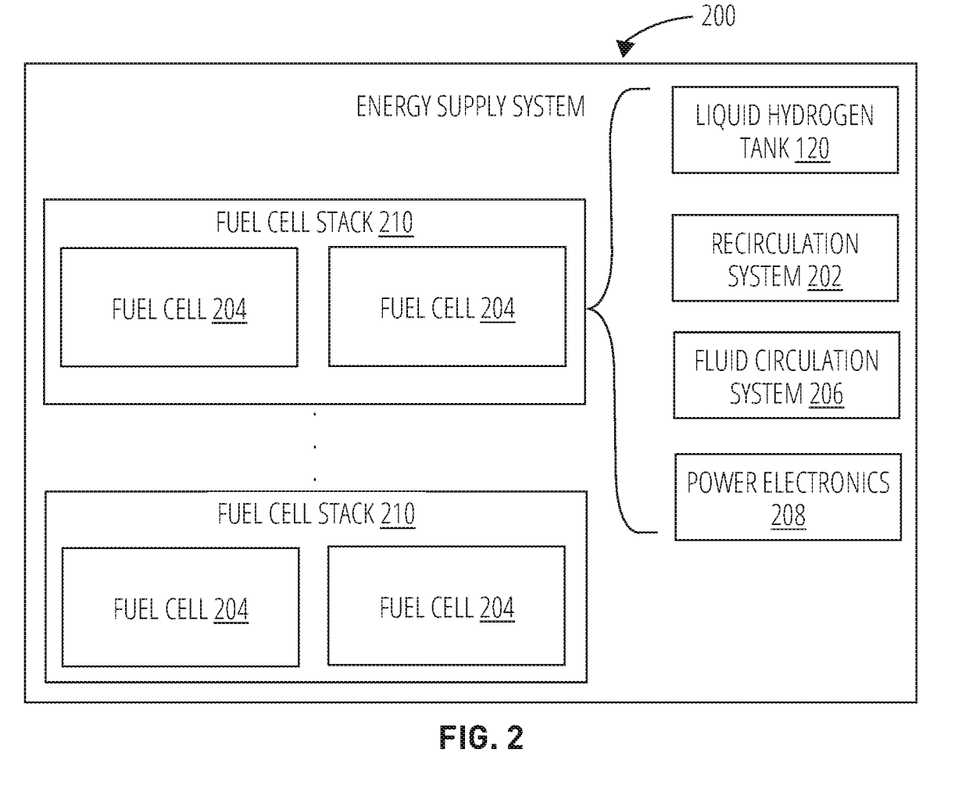
FIG. 2 is a schematic view of an aircraft energy system according to some examples.

FIG. 2 is a schematic view of an aircraft energy supply system 200 according to some examples. As shown, the energy supply system 200 includes one or more fuel cell stacks 210. Each fuel cell stack 210 may include one or more fuel cells 204.

Typically associated with a fuel cell stack 210 are a source of hydrogen such as a liquid hydrogen tank 120, a recirculation system 202 for supplying and returning hydrogen to the fuel cell stack 210, a fluid circulation system 206 for transferring heat, and power electronics 208 for regulating delivery of electrical power from the fuel cell stacks 210 during operation and to provide integration of the fuel cell stacks 210 with the electronic infrastructure of the aircraft 100.

The electronic infrastructure can include an energy supply management system, for monitoring and controlling operation of the fuel cell stacks 210.

The fuel cell stacks 210 function to convert chemical energy into electrical energy for supply to the propulsion systems 108. Fuel cell stacks 210 can be arranged and/or distributed about the aircraft in any suitable manner. Fuel cell stacks can be arranged within wings (e.g., inside of an airfoil cavity), inside nacelles, and/or in any other suitable location on the aircraft.

The energy supply system 200 can optionally include a heat transfer system (e.g., fluid circulation system 206) that functions to transfer heat from or to various components of the aircraft 100, for example by circulating a working fluid within a fuel cell stack 210 to remove heat generated during operation, to provide heat for evaporation of liquid hydrogen from the liquid hydrogen tank 120, or to remove heat from other heat-generating components within the aircraft 100.

Figure 3:
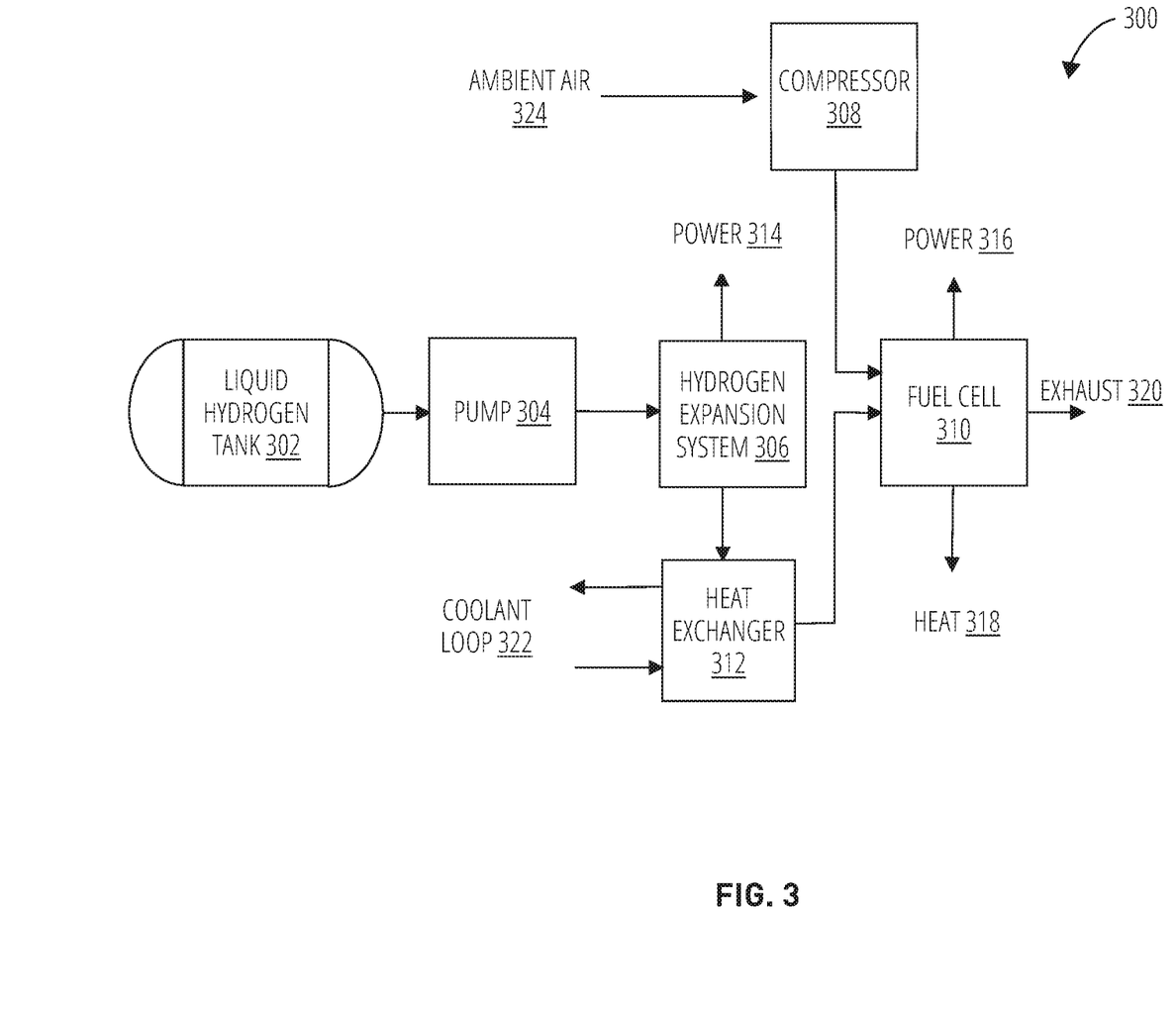
FIG. 3 is a schematic diagram illustrating a hydrogen fuel cell system, according to some examples.

FIG. 3 is a schematic diagram illustrating a hydrogen fuel cell system 300, according to some examples. The fuel cell system 300 comprises a liquid hydrogen tank 302, a pump 304, a hydrogen expansion system 306, a heat exchanger 312, a compressor 308 and a fuel cell 310.

The liquid hydrogen tank 302, as its name suggests, stores liquid hydrogen for use in the fuel cell 310. The liquid hydrogen tank 302 is connected to, and supplies liquid hydrogen to the pump 304. The pump 304 pressurizes the liquid hydrogen and supplies it to the hydrogen expansion system 306.

As will be described in more detail below, the hydrogen expansion system 306 vaporizes and expands the liquid hydrogen from the pump 304 closer to, or to, the pressure and temperature required by the fuel cell 310. The hydrogen expansion system 306 extracts work from the expansion of the hydrogen gas, which may be used to drive other systems directly or may provide electrical power 314 that can be used to supplement the electrical power 316 generated by the fuel cell 310. Since the evaporation and expansion of the liquid hydrogen requires heat, the hydrogen expansion system 306 can also provide cooling to other heat-generating systems, such as the fuel cell 310 or the compressor 308, which is used to compress the air containing the oxygen used by the fuel cell 310.

Warmer, but still cold, hydrogen gas leaving the hydrogen expansion system 306 passes through a heat exchanger 312, which is thermally coupled to a coolant loop 322. The coolant loop 322 includes a coolant liquid that can be circulated to and from a heat source (not shown) to cool the heat source. In some examples, the cold hydrogen gas leaving the hydrogen expansion system 306 may cool a heat source more directly, for example by having the heat exchanger 312 located at or near the heat source.

The compressor 308 compresses ambient air 324 for supply to the fuel cell at the pressure required by the fuel cell 310. Compressing the ambient air 324 increases its temperature. The coolant from the coolant loop 322 may thus be used to precool the ambient air 324 at the inlet of the compressor 308, or to cool the compressor 308 itself. Supplying cooler air to the compressor 308 increases its efficiency.

Warmer hydrogen gas leaving the heat exchanger 312 is received by the fuel cell, which together with the compressed air received from the compressor 308, generates electrical power 316, heat 318 and a water vapor exhaust 320 as is known in the art. In some examples the coolant loop 322 is used to cool the fuel cell 310 in addition to or instead of cooling the ambient air 324 or the compressor 308.

Figure 4:
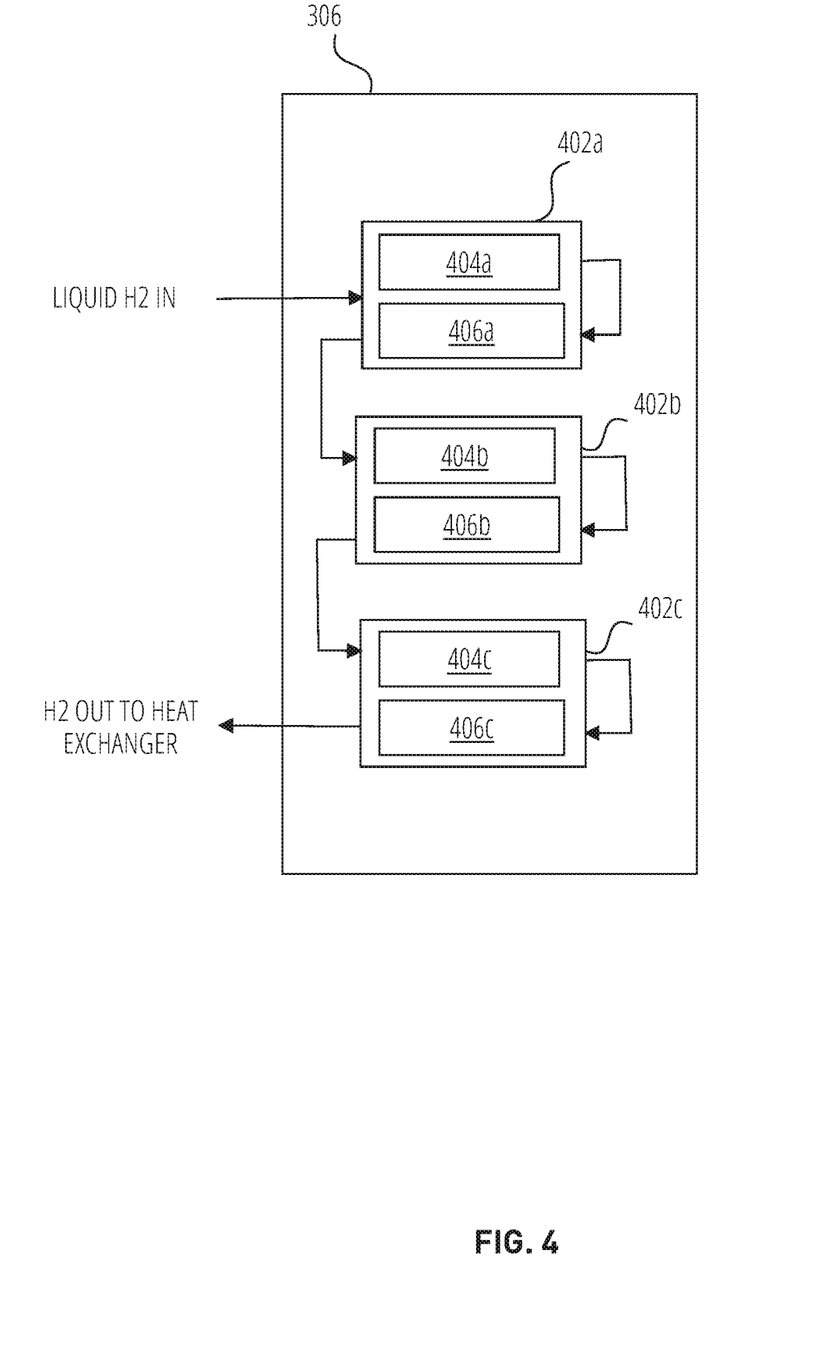
FIG. 4 is a schematic diagram of the hydrogen expansion system of FIG. 3, according to some examples.

FIG. 4 is a schematic diagram of the hydrogen expansion system 306 of FIG. 3, according to some examples. The hydrogen expansion system 306 shown in FIG. 4 is a multi-stage expansion system, although it will be appreciated that a single stage could be used in other examples. Three stages are illustrated, although more or less could be provided in other examples.

The hydrogen expansion system 306 includes three hydrogen expansion modules 402a, 402b and 402c. Liquid hydrogen from the pump 304 is provided to the hydrogen expansion module 402a, which in turn provides cold hydrogen gas to the hydrogen expansion module 402b, which in turn provides warmer hydrogen gas to the heat exchanger 312 after it exits the hydrogen expansion system 306.

The hydrogen expansion module 402a includes an aeolipile 404a and a heat exchanger 406a. The liquid hydrogen entering the hydrogen expansion module 402a is evaporated and expanded using heat from the heat exchanger 406a. The aeolipile 404a is powered by the expansion of the hydrogen gas, the operation of which generates electrical or manual power. Rotation generated by the aeolipile 404a is used to drive a generator in some examples, to generate electrical power. The expanded hydrogen gas leaves the aeolipile 404a and is passed back into the heat exchanger 406a, where the heat contained in the expanded hydrogen gas is used to evaporate and expand the incoming liquid hydrogen from the pump 304. This cools and contracts (and possibly condenses) the expanded hydrogen gas, which is then passed on to the hydrogen expansion module 402b.

The hydrogen expansion module 402b, (comprising an aeolipile 404b and a heat exchanger 406b) and the hydrogen expansion module 402c (comprising an aeolipile 404c and a heat exchanger 406c) function similarly to the hydrogen expansion module 402a, to extract work from and continue warming the hydrogen gas as it passes through the hydrogen expansion system 306, although there may be implementation differences, for example in the nature or implementation of the aeolipiles 404b and 404c. The hydrogen expansion modules 402a, 402b and 402c use the Rankine thermodynamic cycle.

The warmer, but still cold, hydrogen gas leaves the hydrogen expansion system 306 and passes to the heat exchanger 312.

Figure 5:
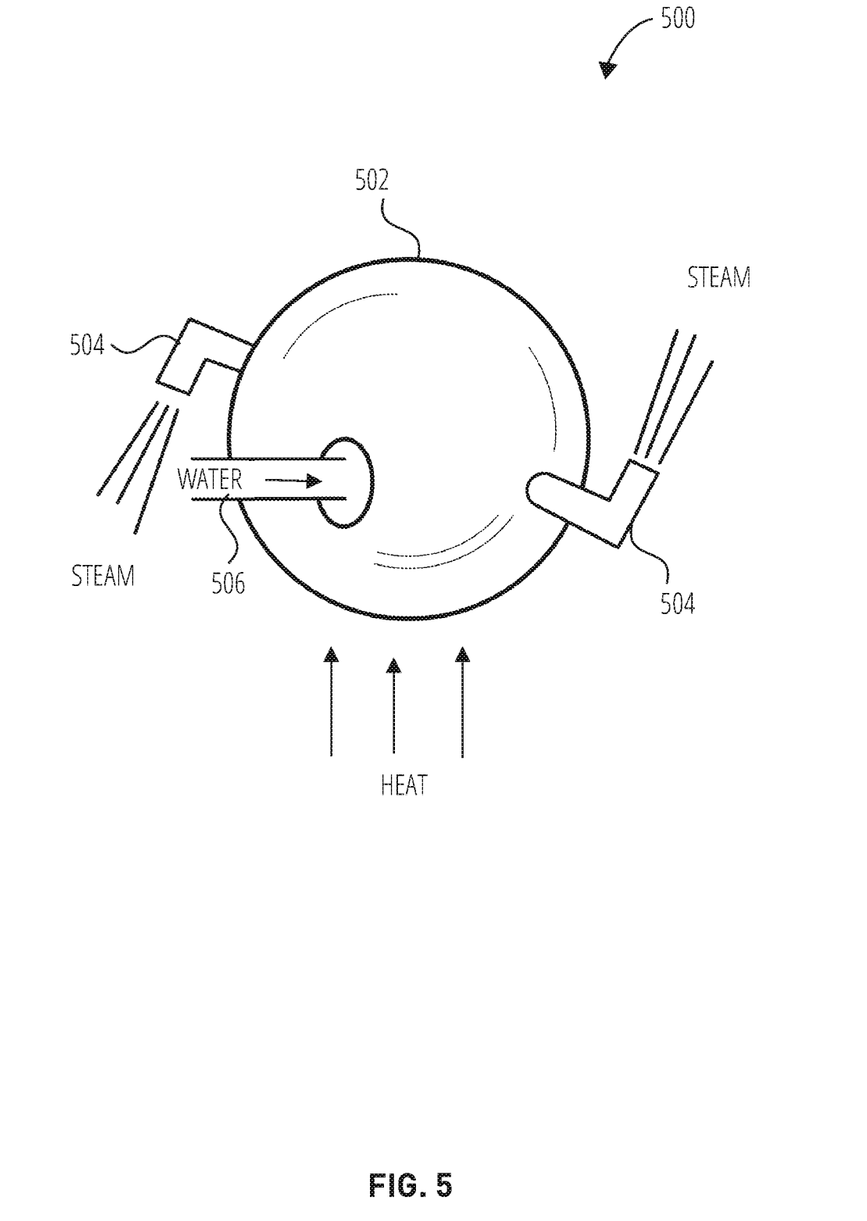
FIG. 5 shows an early form of steam aeolipile, known as an aeolipile.

FIG. 5 illustrates an early form of steam aeolipile, known as an aeolipile 500. The aeolipile 500 comprises a spherical vessel 502, an inlet 506 and two nozzles 504. Water is supplied to the vessel 502 via the inlet 506. The vessel is heated (typically over a fire), vaporizing the water in the vessel 502 into steam. The steam exits the nozzles 504 at high speed, the reaction to which causes the vessel 502 to rotate.

Figure 6:
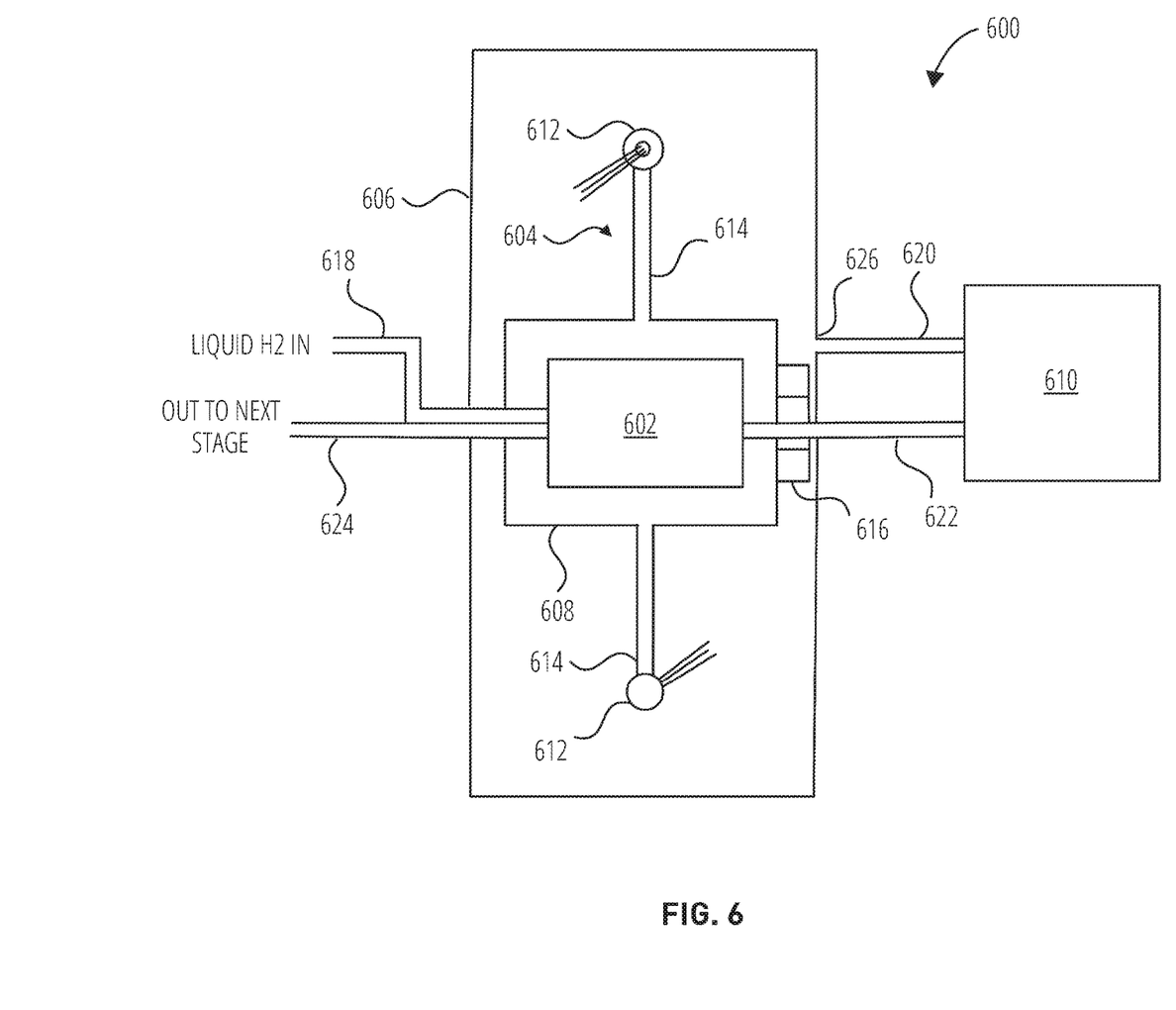
FIG. 6 is a schematic diagram illustrating an expansion module including an aeolipile, according to some examples.

FIG. 6 is a schematic diagram illustrating an expansion module 600, according to some examples. The expansion module 600 includes an aeolipile 604 located inside a module housing 606, a heat exchanger 602 located inside the aeolipile 604 and a pump 610 to receive hydrogen gas expelled from the aeolipile 604 and to return it to the heat exchanger 602. Also included is a motor/generator 616 to convert rotation of the aeolipile 604 into electrical energy, and pipes 618, 620, 622 and 624 to route the hydrogen through the expansion module 600.

The aeolipile 604 comprises an aeolipile housing 608, hollow arms 614 that are in fluid communication with the inside of the aeolipile housing 608, and which direct hydrogen gas to nozzles 612 to rotate the aeolipile 604 within the module housing 606. The aeolipile 604 is rotationally coupled to the module housing 606, for example by means of hollow shafts located in bearings or bushings (not shown) on each side of the aeolipile housing 608. Evaporated and expanding hydrogen gas is supplied to the interior of the aeolipile housing 608 from holes in the heat exchanger 602.

In use, expanding hydrogen gas leaves the heat exchanger 602, passes through the aeolipile housing 608 and the hollow arms 614, and leaves the aeolipile 604 through the nozzles 612, rotating the aeolipile 604 and a rotor of the motor/generator 616, which in turn generates electrical power that is provided to the aircraft's electrical system. Hydrogen ejected from the nozzles 612 is initially contained by the module housing 606, and then exits via an outlet 626 into a pipe 620 that supplies the expanded hydrogen to the pump 610. The pump 610 serves to return the expanded hydrogen gas to the heat exchanger 602 via a pipe 622.

The heat exchanger 602, via pipe 618, is either supplied with pressurized liquid hydrogen from the pump 304 or supplied with hydrogen from a hydrogen expansion module forming an earlier stage as shown in FIG. 4. Warmer, expanded hydrogen gas returns to the heat exchanger 602 from the pump 610 via a pipe 622, passes through a radiator core (not shown) inside the heat exchanger 602, where it is cooled by the hydrogen supplied to the heat exchanger 602 by the pipe 618, before leaving to the next stage or the heat exchanger 312 via pipe 624.

In use, the hydrogen supplied by the pipe 618 flows onto or around the radiator core inside the heat exchanger 602, where it is heated, evaporates if in liquid form, and expands. Expanding hydrogen gas leaves the heat exchanger 602 and passes into the aeolipile housing 608 through holes in the heat exchanger 602. Expanding hydrogen gas leaving the aeolipile 604 via the nozzles 612 turns the aeolipile 604 against the resistance of the motor/generator 616, generating electrical power.

Expanded hydrogen gas leaves the module housing 606 via pipe 620, and is returned to the heat exchanger 602 by pump 610 via pipe 622. The returning hydrogen is cooled by transferring heat to the supply hydrogen entering the heat exchanger 602 from pipe 618, as the returning hydrogen passes through the radiator core in the heat exchanger 602. The returning hydrogen then leaves the expansion module 600 via pipe 624, and is then passed to either the next expansion module stage or to the heat exchanger 312.

The evaporation and expansion of the liquid hydrogen in the liquid hydrogen tank 302 to the pressure and temperature of required by the fuel cell 310 thus can not only be used to provide cooling (through heat exchanger 312) that is required by, or desirable for, other systems or components of the aircraft, but can be used to generate additional electrical power that can reduce the electrical load on the fuel cell 310, with corresponding increases in efficiency, range and so forth.

Figure 7:
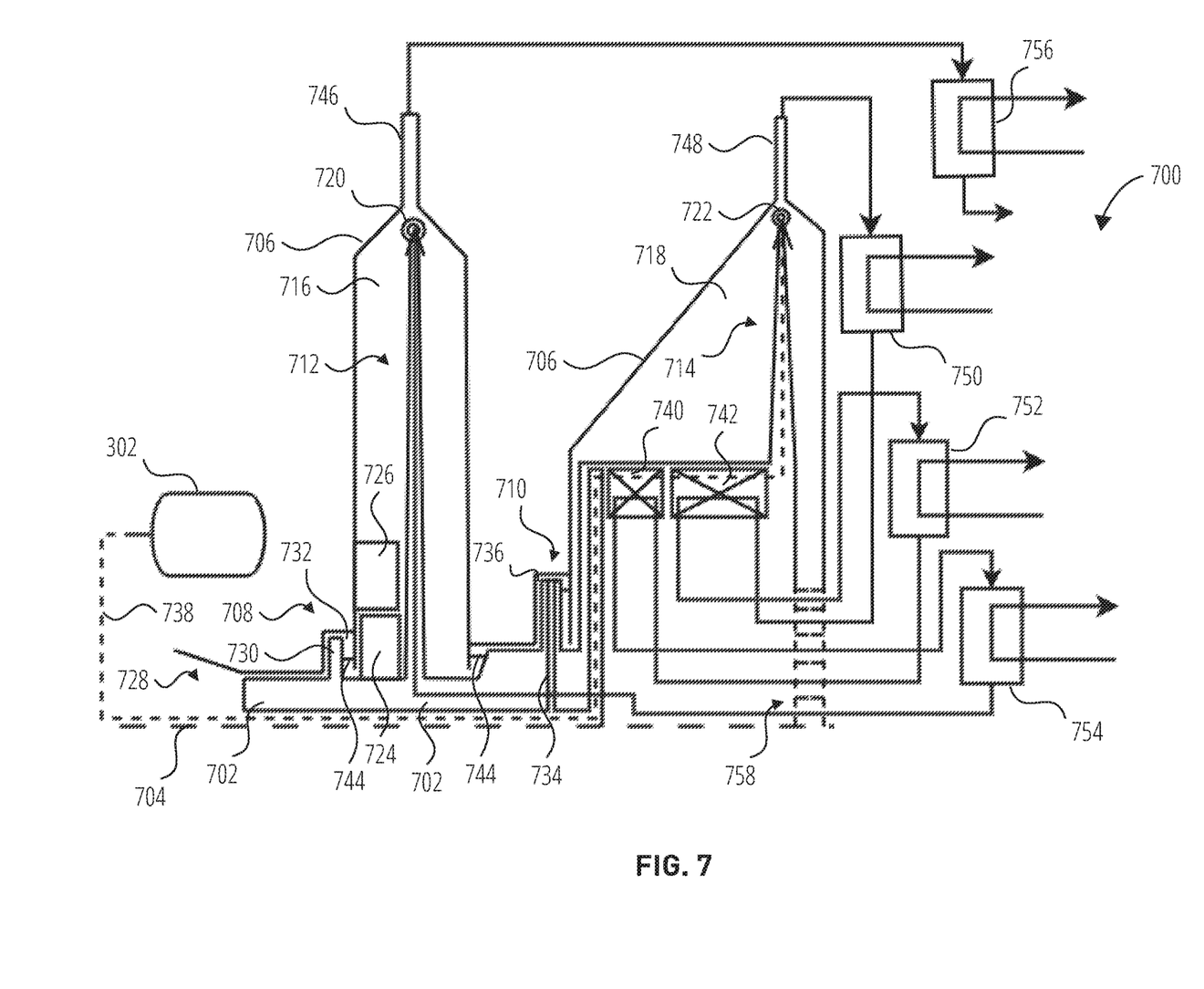
FIG. 7 is a schematic diagram illustrating a two stage aeolipile expansion module, according to some examples.

FIG. 7 is a schematic diagram illustrating a two stage aeolipile expansion module 700 according to some examples. The two stage aeolipile expansion module 700 incorporates a fast spinning rotor 702 spinning about a rotor axis 704. The rotor 702 is supported on two hydrodynamic bearings 708, 710 that utilize liquid hydrogen as their support fluid, though optionally hydrogen gas bearings may be used as an alternative. The rotor 702 is contained in a housing 706.

The rotor 702 incorporates a low pressure aeolipile 712 and a high pressure aeolipile 714 operating in separate chambers at different pressures, low pressure chamber 716 and, high pressure chamber 718 formed by the housing 706. The low pressure aeolipile 712 includes low pressure nozzles 720 (only one of which is illustrated in FIG. 7) and the high pressure aeolipile 714 includes high pressure nozzles 722 (only one of which is illustrated in FIG. 7) through which hydrogen gas expands in a largely tangential direction so as to drive rotation of the rotor 702. Rotation of the rotor 702 produces a net power output that may be turned into electricity by a motor/generator 616 incorporated into the rotor 702, and shown as rotor 724 and stator 726, while the expansion of the hydrogen also increasing the amount of cooling that may be provided to other systems, particularly for cooling at temperatures below ambient temperatures.

The low pressure chamber 716 and high pressure chamber 718 are maintained at different pressures by rotary expeller seals formed by the hydrodynamic bearings 708, 710. As can be seen, hydrodynamic bearing 708 is formed by the combination of an annular disk 730 rotating in an annular cavity 732 formed by the housing 706, and the hydrodynamic bearing 710 is formed by an annular disk 734 rotating in an annular cavities 736 formed by the housing 706.

The hydrodynamic bearings 708, 710 are in fluid communication with a hydrogen inlet 728, which receives liquid hydrogen from liquid hydrogen tank 302. Liquid hydrogen received in the cavities 732, 736 is driven to rotate by the annular disks 730, 734 rotating within their cavities 732 736, so as to create radial pressure gradients within the liquid hydrogen that balances the pressure differentials that exist between the two sides of each of the annular disks 730, 734. This allows a free surface boundary 744, between the gaseous and liquid hydrogen in each hydrodynamic bearing 708, 710, to be at different radii on either side of each annular disk 730, 734.

In operation, rotation of the rotor 702 may be initiated by power supplied to the motor/generator 616 (comprising rotor 724 and stator 726). As illustrated by dashed line 738, liquid hydrogen entering the hydrogen inlet 728 of the rotor 702 flows axially before being directed to flow radially outwards in liquid form, undergoing centrifugal pumping to elevated pressures, until it reaches the inlet to a heat exchanger 740 that evaporates the now pressurized liquid hydrogen and subsequently begins to superheat the hydrogen after it has evaporated.

The evaporation and superheating of the hydrogen in heat exchanger 740 is done by heat transfer from a first flow of returning heated hydrogen gas from a counter-flow heat exchanger 752, which is used as part of a coolant loop such as coolant loop 322. The gaseous hydrogen then passes from the heat exchanger 740 to a further counter-flow heat exchanger 742 for further heating by heat transfer from a second flow of returning heated hydrogen gas from a heat exchanger 750, which is also used as part of a coolant loop such as coolant loop 322. Returning hydrogen flows from heat exchangers 750, 752 and 754 enters and exits the rotor through coaxial rotary ports 758 on an axial face of the rotor 702, although in some examples the ports 758 are on more than one axial face to reduce the diameters of the ports 758. The ports 758 include non-contact seals to permit transfer of the returning hydrogen gas into rotor 702.

The more highly pressurized hydrogen gas at a higher temperature passes from the heat exchanger 742 to the interior of the high pressure aeolipile 714 such that it is delivered radially outwards to the nozzles 722 of the high pressure aeolipile 714, where it expands through each nozzle 722 imparting a torque upon the rotor 702 while substantially cooling the hydrogen gas as it accelerates through the nozzles. The cooled gas from the nozzles 722 exits the high pressure chamber 718 through an annular diffuser 748 that recovers some of the residual velocity in the hydrogen gas, by converting it into increased pressure.

The cool hydrogen gas from the high pressure diffuser 748 then flows through a first warming heat exchanger 750 that in turn sinks heat from an external source (as discussed above with reference to coolant loop 322), before the now-warmed hydrogen gas is returned to the heat exchanger 742 rotor through one of the rotary inlet ports 758. After superheating the incoming flow of hydrogen gas from the liquid hydrogen tank 302 and heat exchanger 740 in heat exchanger 742, the returning hydrogen gas exits the rotor 702 through an outlet port 758 at greater radius from the rotor axis 704 compared to its incoming port 758. This provides additional centrifugal pumping of the hydrogen gas flow to overcome some of the pressure drops created by flow losses and impeding radial pressure gradients as the hydrogen gas leaves the heat exchanger 742.

The returning hydrogen gas then passes through another heat exchanger 752 to raise its temperature again before passing back into the rotor 702 to flow through the liquid hydrogen evaporator and superheater heat exchanger 740, which cools the return flow of hydrogen again before it exits the rotor 702, again through a port 758 greater than the radius of the port 758 by which it entered, again to provide centrifugal pumping to overcome some of the pressure drops created by flow losses and impeding radial pressure gradients as the returning hydrogen gas leaves the heat exchanger 752 again.

The cooled hydrogen gas exiting the rotor 702 from the heat exchanger 752 is then passed through a third reheating heat exchanger 754 to warm the hydrogen gas before it re-enters the rotor 702 for a final time through one of the ports 758. The returning hydrogen gas then flows through passages in the rotor 702 and into the low pressure aeolipile 712, such that it is delivered radially outwards to the nozzles nozzle 720 of the high pressure aeolipile 714, where it expands through the nozzle 722 imparting a torque upon the rotor 702 while substantially cooling the hydrogen gas as it accelerates through the nozzles 720. The cooled gas from the nozzles 720 then exits the low pressure chamber 716 through an annular diffuser 746 that recovers some of the residual velocity in the hydrogen gas, by converting it into increased pressure. The hydrogen gas is then passed to a final heat exchanger 756 that provides further heat sinking to an external heat source, after which the hydrogen gas is passed to the fuel cell 310.

The two-stage aeolipile expansion module 700 may allow more efficient and so greater extraction of energy from the heating process of a small flow of liquid hydrogen than does the single expansion module 600 of FIG. 6, while also potentially providing greater cooling at temperatures below the ambient temperature.

The use of rotary expeller seals formed by the hydrodynamic bearings 708, 710 also usefully enables the inlet pressure of the liquid hydrogen from the liquid hydrogen tank 302 to be below the outlet pressure of the gaseous hydrogen from the low pressure chamber 716, without requiring a separate liquid hydrogen pump, and may thus allow the liquid hydrogen supply to operate at lower pressures and so higher densities, to reduce the mass and volume of the liquid hydrogen tank 302.

The use of returning gaseous hydrogen at elevated pressure to provide heat to evaporate and superheat the incoming liquid hydrogen in the heat exchangers 740, 742 avoids the potential of other fluids for freezing at liquid hydrogen temperatures, and the elevated pressure reduces the flow areas required in the heat exchangers heat exchangers 740, 742 compared to lower pressure hydrogen from a single stage aeolipile.

It will be appreciated that the use of expeller seals may be applied to a rotor 702 with one, two or more separate aeolipiles and aeolipile chambers, and that the general principles of the example of FIG. 6 may be more generally applied to rotors with a greater or lesser number of aeolipile chambers depending upon the application.

In some examples, aluminum alloys are used for construction of the heat exchangers 740, 742 within the rotor 702 due to its combination of low density, low strength-sensitivity to hydrogen, increased strength at cryogenic temperatures, and ease of manufacture. In some examples, the heat exchangers 740, 742 are wrapped with carbon fiber or similar high tensile strength composites to enable higher operating speeds and pressures.

Figure 8:
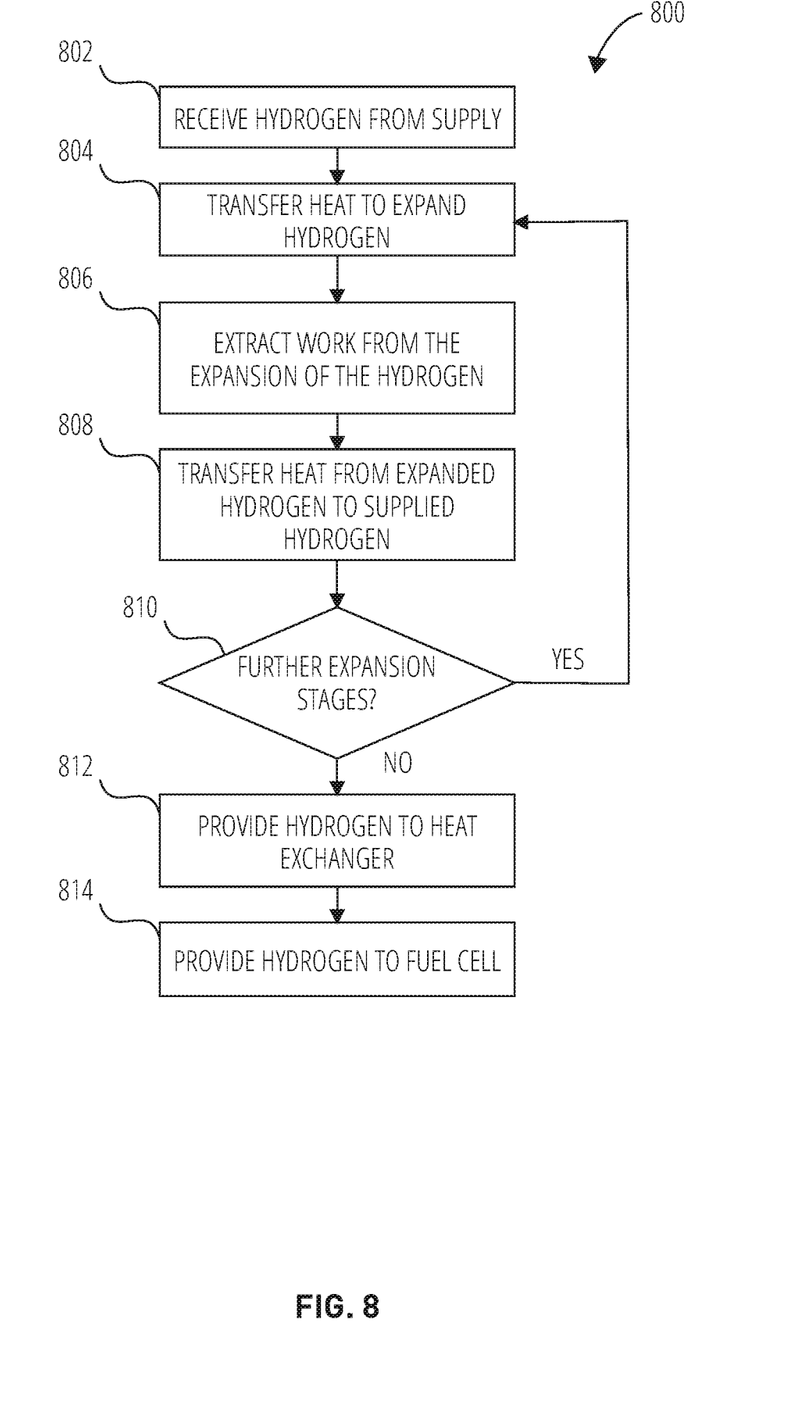
FIG. 8 is a flowchart illustrating operation of the fuel cell system of FIG. 3, according to some examples.

FIG. 8 is a flowchart 800 illustrating operation of the fuel cell system 300, according to some examples. The flowchart 800 commences at operation 802, in which the hydrogen expansion system 306 receives hydrogen from a supply of hydrogen, such as liquid hydrogen tank 302. Heat is transferred to the hydrogen in operation 804, for example from heat exchanger 406a in hydrogen expansion module 402a, causing the hydrogen to expand. Work is extracted from the expansion of the hydrogen in operation 806, for example using the aeolipile 404b in hydrogen expansion module 402a. In some examples the hydrogen expansion module 402a is the aeolipile-based expansion module 600, and the extracted work is be used to generate electrical power using a generator.

The method continues at operation 808, where the expanded hydrogen is cooled. In some examples, this is done by transferring heat from the expanded hydrogen to the supply hydrogen in the heat exchanger 406a of the hydrogen expansion module 402a, which may correspond to the heat exchanger 602 of the expansion module 600.

In operation 810, if there are further hydrogen expansion stages, the cooled hydrogen is supplied to the next hydrogen expansion stage as its supply hydrogen, and the method proceeds from there. If there are no further expansion stages, the expanded hydrogen from the last or only expansion stage is provided in operation 812 to a heat exchanger 312 that provides additional cooling, for example to cool the ambient air 324 to the compressor 308. From the heat exchanger 312, the hydrogen is provided to the fuel cell 310 in operation 814.

Various examples are contemplated. Example 1 is a fuel cell system, comprising: a supply of hydrogen; and a hydrogen expansion system comprising: an aeolipile comprising a plurality of arms coupled to a shaft, each arm having a nozzle at an end thereof for expelling hydrogen to cause rotation of the shaft; and a heat exchanger for receiving and expanding hydrogen from the supply of hydrogen, for provision to the plurality of arms of the aeolipile.

In Example 2, the subject matter of Example 1 includes, a generator coupled to the shaft to generate electrical power from operation of the aeolipile.

In Example 3, the subject matter of Examples 1-2 includes, wherein hydrogen leaving the aeolipile is returned to the heat exchanger to transfer heat to the hydrogen received from the supply of hydrogen.

In Example 4, the subject matter of Examples 1-3 includes, wherein the aeolipile comprises an aeolipile housing for receiving hydrogen gas ejected by the nozzles, the heat exchanger being located inside the aeolipile housing.

In Example 5, the subject matter of Example 4 includes, wherein hydrogen gas leaving the aeolipile housing after exiting the plurality of nozzles is returned to the heat exchanger to provide heat to expand the hydrogen from the supply of hydrogen.

In Example 6, the subject matter of Examples 1-5 includes, after exiting the nozzles is returned to the heat exchanger to provide heat to expand the hydrogen from the supply of hydrogen.

In Example 7, the subject matter of Examples 1-6 includes, a plurality of hydrogen expansion systems, a first hydrogen expansion system receiving hydrogen from the supply of hydrogen and providing hydrogen to a second hydrogen expansion system.

In Example 8, the subject matter of Examples 1-7 includes, wherein the hydrogen expansion system comprises at least one further aeolipile coupled to the shaft.

In Example 9, the subject matter of Example 8 includes, a generator coupled to the shaft to generate electrical power from operation of the aeolipile and the at least one further aeolipile.

In Example 10, the subject matter of Examples 8-9 includes, wherein the shaft is mounted in the hydrogen expansion system via hydrodynamic bearings using liquid hydrogen received from the supply of hydrogen.

In Example 11, the subject matter of Examples 1-10 includes, wherein the heat exchanger is used to cool inlet air for a compressor that supplies air to a fuel cell in the fuel cell system.

In Example 12, the subject matter of Examples 1-11 includes, wherein the shaft is mounted in the hydrogen expansion system via hydrodynamic bearings using liquid hydrogen received from the supply of hydrogen.

In Example 13, the subject matter of Examples 1-12 includes, wherein the heat exchanger is coupled to and rotates with the shaft.

In Example 14, the subject matter of Example 13 includes, wherein the heat exchanger is made of aluminum.

In Example 15, the subject matter of Example 14 includes, wherein the heat exchanger comprises a carbon-fiber overwrap.

In Example 16, the subject matter of Examples 13-15 includes, wherein the shaft is mounted in the hydrogen expansion system via hydrodynamic bearings using liquid hydrogen received from the supply of hydrogen.

Example 17 is a method of expanding hydrogen for provision to a fuel cell in a fuel cell system, comprising: receiving hydrogen from a supply of hydrogen; transferring heat to the hydrogen to expand the hydrogen; extracting work from expansion of the hydrogen by passing it through an aeolipile comprising a plurality of arms coupled to a shaft, each arm having a nozzle at an end thereof for expelling hydrogen thereby to cause rotation of the shaft; and supplying the expanded hydrogen to the fuel cell.

In Example 18, the subject matter of Example 17 includes, wherein extracting work from the expansion of the hydrogen comprises: generating electrical power from rotation of the shaft.

In Example 19, the subject matter of Examples 17-18 includes, wherein transferring heat to the hydrogen comprises: returning the expanded hydrogen to a heat exchanger located at the aeolipile to transfer heat to the hydrogen from the supply of hydrogen prior to supplying the expanded hydrogen to the fuel cell.

In Example 20, the subject matter of Examples 17-19 includes, cooling the expanded hydrogen after extracting the work from the expansion of the hydrogen; transferring heat to the cooled expanded hydrogen to further expand the hydrogen; and extracting work from the further expansion of the hydrogen by passing it through a further aeolipile comprising a plurality of arms coupled to the shaft, each arm having a nozzle at an end thereof for expelling hydrogen thereby to cause rotation of the shaft.

Example 21 is at least one machine-readable medium including instructions that, when executed by processing circuitry, cause the processing circuitry to perform operations to implement of any of Examples 1-20. Example 22 is an apparatus comprising means to implement of any of Examples 1-20. Example 23 is a system to implement of any of Examples 1-20. Example 24 is a method to implement of any of Examples 1-20.

Figure 9:
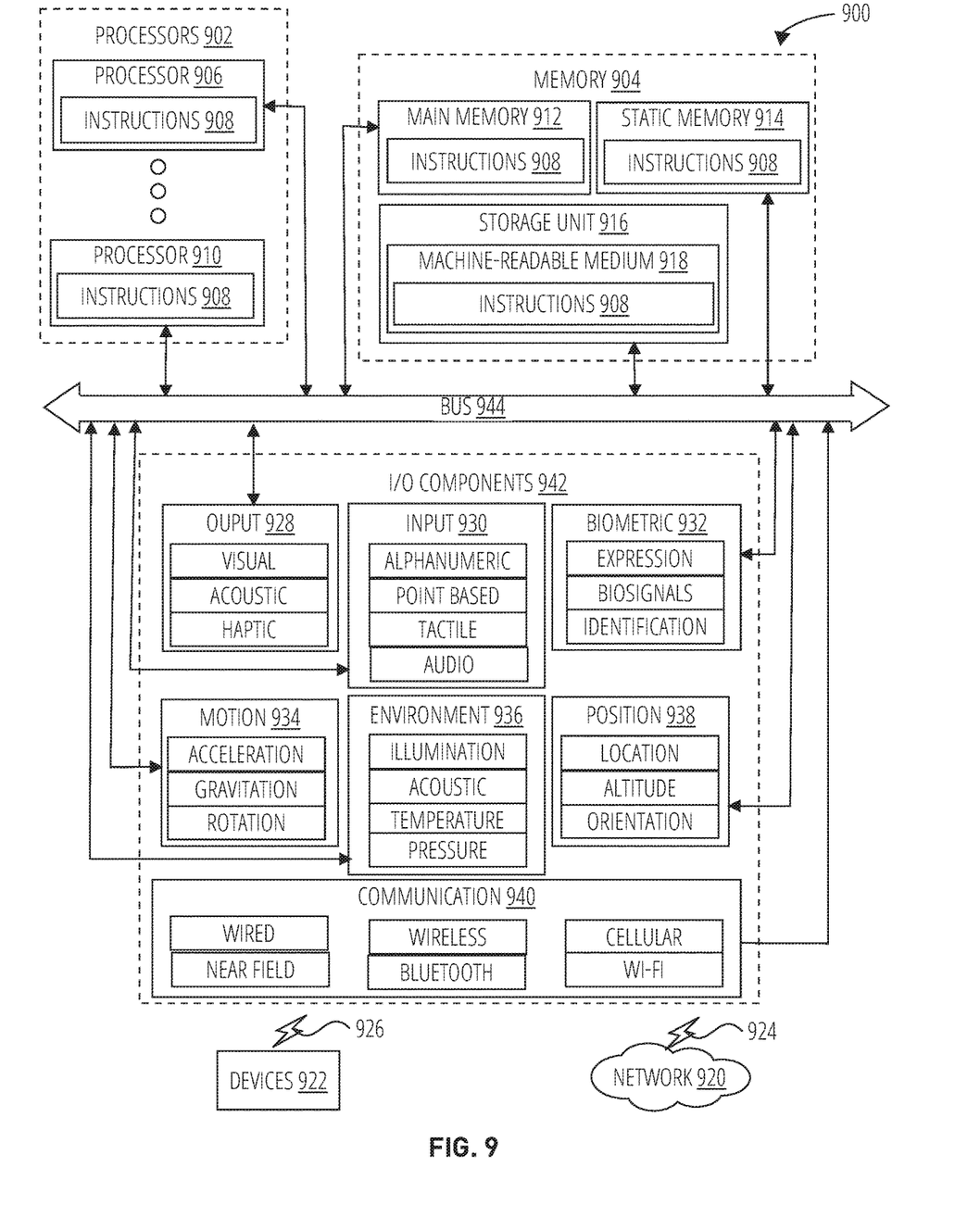
FIG. 9 illustrates a diagrammatic representation of a machine in the form of a computer system within which a set of instructions may be executed for causing the machine to perform any one or more of the methodologies discussed herein, according to some examples.

FIG. 9 illustrates a diagrammatic representation of a machine 900 in the form of a computer system within which a set of instructions may be executed for causing the machine to perform any one or more of the methodologies discussed herein, according to an example. Specifically, FIG. 9 shows a diagrammatic representation of the machine 900 in the example form of a computer system, within which instructions 908 (e.g., software, a program, an application, an applet, an app, or other executable code) for causing the machine 900 to perform any one or more of the methodologies discussed herein may be executed. The instructions 908 transform the general, non-programmed machine 900 into a particular machine 900 programmed to carry out the described and illustrated functions in the manner described. In alternative examples, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines 900 that individually or jointly execute the instructions 908 to perform any one or more of the methodologies discussed herein.

The machine 900 may include processors 902, memory 904, and I/O components 942, which may be configured to communicate with each other such as via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that may execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 may include a main memory 912, a static memory 914, and a storage unit 916, both accessible to the processors 902 such as via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones will likely include a touch input device or other such input mechanisms, while a headless server machine will likely not include such a touch input device. It will be appreciated that the I/O components 942 may include many other components that are not shown in FIG. 9. The I/O components 942 are grouped according to functionality merely for simplifying the following discussion and the grouping is in no way limiting. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 may include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 904, main memory 912, static memory 914, and/or memory of the processors 902) and/or storage unit 916 may store one or more sets of instructions and data structures (e.g., software) embodying or utilized by any one or more of the methodologies or functions described herein. These instructions (e.g., the instructions 908), when executed by processors 902, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 920 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 920 or a portion of the network 920 may include a wireless or cellular network, and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 908 may be transmitted or received over the network 920 using a transmission medium via a network interface device (e.g., a network interface component included in the communication components 940) and utilizing any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Examples of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

What is claimed is:

1. A fuel cell system, comprising:
a supply of hydrogen; and
a hydrogen expansion system comprising:
an aeolipile comprising a plurality of arms coupled to a shaft, each arm having a nozzle at an end thereof for expelling hydrogen to cause rotation of the shaft; and
a heat exchanger for receiving and expanding hydrogen from the supply of hydrogen, for provision to the plurality of arms of the aeolipile.

2. The fuel cell system of claim 1, further comprising:
a generator coupled to the shaft to generate electrical power from operation of the aeolipile.

3. The fuel cell system of claim 1, wherein hydrogen leaving the aeolipile is returned to the heat exchanger to transfer heat to the hydrogen received from the supply of hydrogen.

4. The fuel cell system of claim 1, wherein the aeolipile comprises an aeolipile housing for receiving hydrogen gas ejected by the nozzles, the heat exchanger being located inside the aeolipile housing.

5. The fuel cell system of claim 4, wherein hydrogen gas leaving the aeolipile housing after exiting the nozzles is returned to the heat exchanger to provide heat to expand the hydrogen from the supply of hydrogen.

6. The fuel cell system of claim 1, wherein hydrogen gas leaving the aeolipile after exiting the nozzles is returned to the heat exchanger to provide heat to expand the hydrogen from the supply of hydrogen.

7. The fuel cell system of claim 1, further comprising a plurality of hydrogen expansion systems, a first hydrogen expansion system receiving hydrogen from the supply of hydrogen and providing hydrogen to a second hydrogen expansion system.

8. The fuel cell system of claim 1, wherein the hydrogen expansion system comprises at least one further aeolipile coupled to the shaft.

9. The fuel cell system of claim 8, further comprising:
a generator coupled to the shaft to generate electrical power from operation of the aeolipile and the at least one further aeolipile.

10. The fuel cell system of claim 8, wherein the shaft is mounted in the hydrogen expansion system via hydrodynamic bearings using liquid hydrogen received from the supply of hydrogen.

11. The fuel cell system of claim 1, wherein the heat exchanger is used to cool inlet air for a compressor that supplies air to a fuel cell in the fuel cell system.

12. The fuel cell system of claim 1, wherein the shaft is mounted in the hydrogen expansion system via hydrodynamic bearings using liquid hydrogen received from the supply of hydrogen.

13. The fuel cell system of claim 1, wherein the heat exchanger is coupled to and rotates with the shaft.

14. The fuel cell system of claim 13, wherein the heat exchanger is made of aluminum.

15. The fuel cell system of claim 14, wherein the heat exchanger comprises a carbon-fiber overwrap.

16. The fuel cell system of claim 13, wherein the shaft is mounted in the hydrogen expansion system via hydrodynamic bearings using liquid hydrogen received from the supply of hydrogen.

17. A method of expanding hydrogen for provision to a fuel cell in a fuel cell system, comprising:
receiving hydrogen from a supply of hydrogen;
transferring heat to the hydrogen to expand the hydrogen;
extracting work from expansion of the hydrogen by passing it through an aeolipile comprising a plurality of arms coupled to a shaft, each arm having a nozzle at an end thereof for expelling hydrogen thereby to cause rotation of the shaft; and
supplying the expanded hydrogen to the fuel cell.

18. The method of claim 17, wherein extracting work from the expansion of the hydrogen comprises:
generating electrical power from rotation of the shaft.

19. The method of claim 17, wherein transferring heat to the hydrogen comprises:
returning the expanded hydrogen to a heat exchanger located at the aeolipile to transfer heat to the hydrogen from the supply of hydrogen prior to supplying the expanded hydrogen to the fuel cell.

20. The method of claim 17, further comprising:
cooling the expanded hydrogen after extracting the work from the expansion of the hydrogen;

transferring heat to the cooled expanded hydrogen to further expand the hydrogen; and extracting work from the further expansion of the hydrogen by passing it through a further aeolipile comprising a plurality of arms coupled to the shaft, each arm having a nozzle at an end thereof for expelling hydrogen thereby to cause rotation of the shaft.

\* \* \* \* \*